United States Patent
Shiba et al.

[11] 3,973,969
[45] Aug. 10, 1976

[54] SILVER HALIDE PHOTOGRAPHIC EMULSION

[75] Inventors: Keisuke Shiba; Masanao Hinata; Hirotetu Kato; Akira Sata; Akira Ogawa, all of Minami-ashigara, Japan

[73] Assignee: Fuji Photo Film Co., Ltd., Minami-ashigara, Japan

[22] Filed: May 2, 1975

[21] Appl. No.: 574,147

Related U.S. Application Data

[63] Continuation-in-part of Ser. No. 371,631, June 20, 1973, abandoned.

[30] Foreign Application Priority Data
June 21, 1972 Japan............................... 47-62117

[52] U.S. Cl..................................... 96/124; 96/137
[51] Int. Cl.² ........................................... G03C 1/14
[58] Field of Search............................. 96/124, 137

[56] References Cited
UNITED STATES PATENTS

| | | | |
|---|---|---|---|
| 3,702,251 | 11/1972 | Sato et al. | 96/124 |
| 3,832,189 | 8/1974 | Shiba et al. | 96/124 |
| 3,853,565 | 12/1974 | Thurston et al. | 96/124 |
| 3,864,134 | 2/1975 | Ueda et al. | 96/124 |

*Primary Examiner*—J. Travis Brown
*Attorney, Agent, or Firm*—Sughrue, Rothwell, Mion, Zinn & Macpeak

[57] ABSTRACT

Silver halide photographic emulsions are supersensitized by a combination of at least one sensitizing dye represent by following general formula (I):

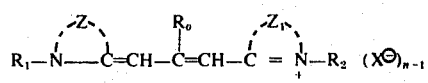

And at least one sensitizing dye represented by following general formula (II):

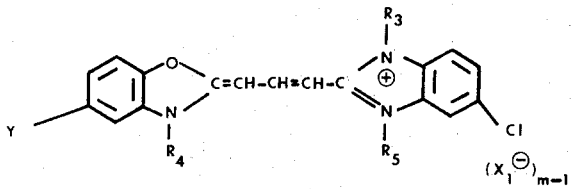

Specific moieties given in the above formulae are identified in the specification.

22 Claims, 3 Drawing Figures

SILVER HALIDE PHOTOGRAPHIC EMULSION

CROSS-REFERENCE TO RELATED APPLICATION

This application is a continuing application of U.S. application Ser. No. 371,631, filed June 20, 1973, now abandoned.

BACKGROUND OF THE INVENTION

1. Field of the Invention

The present invention relates to a spectrally sensitized silver halide photographic emulsion and, more particularly, to a silver halide photographic emulsion supersensitized by a combination of two types of sensitizing dye.

2. Description of the Prior Art

It is well known in the production of photographic light-sensitive materials to add a certain kind of cyanine dye to a silver halide photographic emulsion to thereby extend the light-sensitive wave-length region to the longer wave-length region, i.e., spectral sensitization is well known.

It is also well known that spectral sensitivity is generally influenced by the chemical structure of the sensitizing dye, various properties of the emulsion such as the halogen composition, crystal habit and crystal system of the silver halide, silver ion concentration, hydrogen ion concentration and the like. Furthermore, the spectral sensitivity is also influenced by photographic additives present in the emulsion, such as a stabilizer, anti-fogging agent, coating aid, precipitating agent, color coupler and the like.

In general, only one sensitizing dye is used in a light-sensitive material to sensitize to a desired spectral wave-length region. When sensitizing dyes are used in combination, there results in many cases sensitivity lower than the spectral sensitivity obtained by the use of a single dye. However, in special cases, spectral sensitivity can be raised in a super-additive manner by using one or more sensitizing dyes in combination with a certain sensitizing dye. This phenomenon is known as supersensitization. However, sensitizing dye groups used in combination are specific to each other, and only a slight difference in chemical structure exerts a great influence on this supersensitizing action. Therefore, useful combinations of sensitizing dyes are difficult to predict merely from the chemical structure.

The sensitizing action produced by a certain kind of sensitizing dye is influenced by the type of emulsion to which the dye is to be added, in particular, the halogen composition, crystal habit and crystal system of the silver halide.

Furthermore, the sensitizing action on a definite emulsion can be varied by changing the conditions in the emulsion. For example, the sensitizing action can be enhanced by increasing the silver ion concentration or decreasing the hydrogen ion concentration, or by varying both factors. Therefore, the sensitizing action can be enhanced by immersing a film having coated thereon a spectrally sensitized emulsion in water or an aqueous ammonia solution. The above-described method for changing the sensitivity of a sensitized emulsion by an increase in the silver ion concentration or a decrease in the hydrogen ion concentration, or by both, is usually referred to as hypersensitization. In general, a hypersensitized emulsion has a short storage life.

In applying supersensitization to a silver halide photographic emulsion, it is required that the sensitizing dyes used exert no detrimental interaction with other photographic additives and have photographic characteristics which are stable during the storage of light-sensitive materials.

Furthermore, it is required the sensitizing dyes used leave no residual color derived from the sensitizing dyes in the processed light-sensitive material. Particularly, it is required that in rapid processing (usually conducted in several seconds to several 10 seconds) that no residual dye be present.

On the other hand, as panchromatically spectrosensitized photographic light-sensitive materials, there are known high speed negative light-sensitive materials, light-sensitive materials for use in copying, and the like. In a light-sensitive material for use in copying, such as microfilms, the colors used in the original range over almost the entire visible spectrum, and, as an exposure light source, one containing light of longer wavelengths in a larger amount, such as tungsten light, is often employed in addition to sun light. For this reason, the intrinsic sensitivity of silver halide is insufficient, and it is necessary to panchromatically spectrosensitize the material. In particular, it is important in microfilms to provide a strong antihalation layer so as to obtain a high resolving power, and hence a panchromatically spectrosensitized silver halide photographic emulsion having high light-sensitivity is required.

SUMMARY OF THE INVENTION

One object of the present invention is to provide a silver halide photographic emulsion provided with high sensitivity in the total visible spectral region by a supersensitization action, and, in particular, to provide a photographic emulsion excellent in its spectral sensitization property in the longer wavelength region.

Another object of the invention is to provide a silver halide photographic emulsion leaving no stains in a photographic element subjected to photographic processings.

Other objects of the invention will become apparent from the following description of the specification.

The above-described objects of the present invention are attained by incorporating in a silver halide photographic emulsion at least one sensitizing dye represented by the following general formula (I);

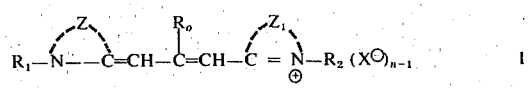

wherein Z and $Z_1$ each represents the atoms necessary to complete a benzothiazole nucleus, naphthothiazole nucleus or benzoselenazole nucleus, which may be the same or different from each other, $R_o$ represents a lower alkyl group (having 1 - 4 carbon atoms), e.g., methyl, ethyl, etc., $R_1$ and $R_2$ each represents an alkyl group containing at least one carboxyl group wherein the alkyl moiety preferably has up to 4 carbon atoms [e.g., carboxymethyl, β-carboxyethyl, γ-carboxypropyl, δ-carboxybutyl, carboxyalkoxyalkyl [2 alkyl moieties] (e.g., 2-(2-carboxyethoxy)ethyl, etc.), carboxyaralkyl wherein the aryl moiety contains a benzene ring (e.g., p-carboxybenzyl, etc.), etc.] or an alkyl group containing at least one sulfo group wherein the alkyl moiety preferably has up to 4 carbon atoms [e.g., β-sulfoethyl, γ-sulfopropyl, γ-sulfobutyl, δ-sulfobutyl, hydroxysulfoalkyl (e.g., 2-hydroxy-3-sulfopropyl, etc.), sulfoalkoxyalkyl (e.g., 2-(3-sulfopropoxy)ethyl, 3-methoxy-2-(3-sulfopropoxy)propyl, 2-[2-(3-sulfopropoxy)ethoxy] ethyl, 2-hydroxy-3-(3'-sulfopropoxy)propyl, etc.), acetoxysulfoalkyl (e.g., 2-acetoxy-3-sulfopropyl, etc.), sulfoaralkyl wherein the aryl moiety contains a benzene ring (e.g., p-sulfophenethyl, p-sulfobenzyl, etc.), etc., where at least one of $R_1$ and $R_2$ represents an alkyl group containing a sulfo group, X represents an anion forming a salt with a quaternary nitrogen atom (cationic atom) in the cyanine dye, $n$ represents 1 or 2, and when $n=1$, the dye forms a betaine-like structure (inner salt); and at least one sensitizing dye represented by the following general formula (II);

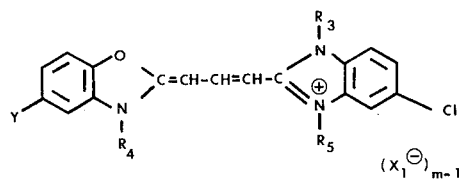

wherein $R_3$ represents a lower alkyl group (having 1 – 4 carbon atoms), e.g., methyl, ethyl, n-propyl, etc., or an allyl group, Y represents a halogen atom, e.g., fluorine, chlorine, bromine, etc., $R_4$ represents an alkyl group (i.e., unsubstituted alkyl groups and substituted alkyl groups such as are commonly used in cyanine dyes wherein the alkyl moiety preferably has 1 – 4 carbon atoms), e.g., methyl, ethyl, hydroxyalkyl (e.g., β-hydroxyethyl, δ-hydroxybutyl, etc.), acetoxyalkyl (e.g., β-acetoxyethyl, γ-acetoxypropyl, etc.), a sulfo- or carboxyl-containing alkyl group as described hereinafter with respect to $R_5$, etc. (provided that when $R_5$ represents an alkyl group containing a sulfo group $R_4$ represents a group other than a sulfo-containing alkyl group), $R_5$ represents an alkyl group containing at least one carboxyl group wherein the alkyl moiety preferably has 1 – 4 carbon atoms [e.g., carboxymethyl, β-carboxyethyl, γ-carboxypropyl, δ-carboxybutyl, carboxyalkoxyalkyl (e.g., 2-(2-carboxyethoxy)ethyl, etc.), carboxyaralkyl wherein the aryl moiety contains a benzene ring (e.g., p-carboxybenzyl, etc.), etc.], or an alkyl group containing at least one sulfo group wherein the alkyl moiety preferably has 1 – 4 carbon atoms [e.g., β-sulfoethyl, γ-sulfopropyl, δ-sulfobutyl, hydroxysulfoalkyl (e.g., 2-hydroxy-3-sulfopropyl, etc.), sulfoalkoxyalkyl (e.g., 2-(3-sulfopropoxy)ethyl, 3-methoxy-2-3-sulfopropoxy)propyl, 2-[2-(3-sulfopropoxy)ethoxy]ethyl, 2-hydroxy-3-(3'-sulfopropoxy)propyl, etc.), acetoxysulfoalkyl (e.g., 2-acetoxy-3-sulfopropyl, etc.), sulfoaralkyl wherein the aryl moiety contains a benzene ring (e.g., p-sulfophenethyl, p-sulfobenzyl, etc.), etc.], $X_1$ represents an anion forming a salt with a quarternary nitrogen atom (cationic atom) in the cyanine dye, $m$ represents 1 or 2 and, when $n=1$, the dye forms a betaine-like structure (inner salt).

DETAILED DESCRIPTION OF THE INVENTION

Figure 1:
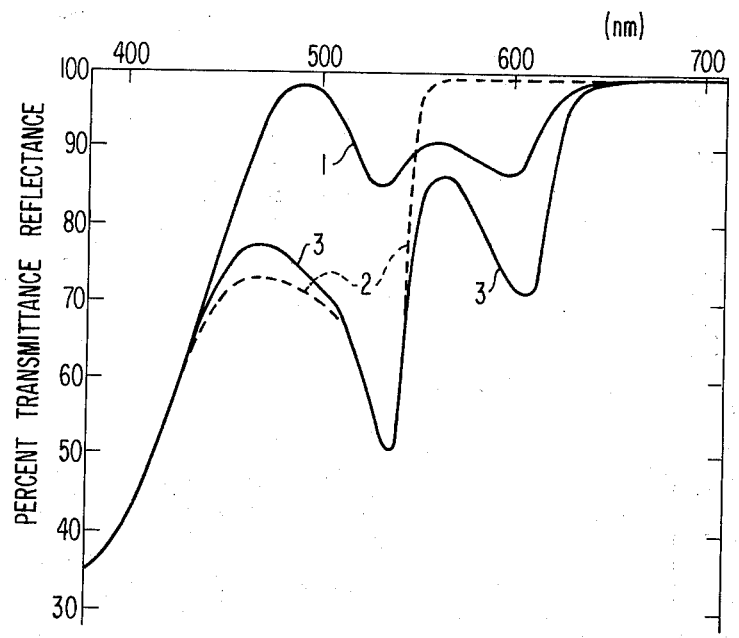
FIG. 1 shows spectral absorption curves of the samples prepared by adding dyes to a silver bromoiodide emulsion (I:1.5 mol%) comprising cubic and regular grains and applying to a film, wherein curve 1 is the spectral absorption curve obtained by adding 4 cc of sensitizing dye I-10 to the emulsion (per 100 g) as a solution of $5 \times 10^{-4}$ mol/liter, curve 2 is the spectral absorption curve obtained by adding 8 cc of sensitizing dye II-6 to the emulsion (per 100 g) as a solution of $1 \times 10^{-3}$ mol/liter, and curve 3 is the spectral absorption curve obtained by adding 4 cc of sensitizing dye I-10 as a solution of $5 \times 10^{-4}$ mol/liter and 8 cc of sensitizing dye II-6 as a solution of $1 \times 10^{-3}$ mol/liter to the emulsion (per 100 g).

As the benzothiazole nucleus, naphthothiazole nucleus and benzoselenazole nucleus completed by Z or $Z_1$, there can be illustrated, for example, benzothiazole which can be optionally substituted by substituents as are commonly used in cyanine dyes, e.g., a halogen atom, alkyl group, an alkoxy group, a hydroxy group, a cyano group or two or more thereof, where the alkyl or alkoxy moiety preferably has up to 4 carbon atoms, e.g., halogenobenzothiazole (e.g., 5-chlorobenzothiazole, 5-bromobenzothiazole, 6-chlorobenzothiazole, 6-bromobenzothiazole, etc.), alkylbenzothiazole (e.g., 5-methylbenzothiazole, 6-methylbenzothiazole, 5-trifluoromethylbenzothiazole, etc.), alkoxybenzothiazole (e.g., 5-methoxybenzothiazole, 5-ethoxybenzothiazole, 5-methoxy-6-methylbenzothiazole, etc.), hydroxybenzothiazole (e.g, 5-hydroxybenzothiazole, etc.), cyanobenzothiazole (e.g., 5-cyanobenzothiazole, etc.), α-naphthothiazole, β-naphthothiazole and benzoselenazole optionally substituted by substituent(s) as are commonly used in cyanine dyes such as a halogen atom, an alkyl group, a hydroxy group, an alkoxy group, or two or more thereof, where the alkyl or alkoxy moiety preferably has up to 4 carbon atoms, e.g., halogenobenzoselenozole (e.g., 5-chlorobenzoselenazole, etc.), alkylbenzoselenazole (e.g., 5-methylbenzoselenazole, 5,6-dimethylbenzoselenazole, etc.), hydroxybenzoselenazole (e.g., 5-hydroxybenzoselenazole, etc.) and alkoxybenzoselenazole (e.g., 5-ethoxy-6-methylbenzoselenazole, etc.).

As examples of the anion represented by X or $X_1$, there are illustrated a halogen ion (e.g., a chloride ion, bromide ion, iodide ion), a mineral acid anion (e.g. thiocyanate ion, sulfate ion, perchlorate ion), an organic acid anion (e.g. p-toluenesulfonate ion, methylsulfate ion, ethylsulfate ion), and the like.

Specific examples of the dyes represented by general formulae (I) and (II) will now be shown below. First, typical examples of the dyes represented by general formula (I) will be shown below, which, however, do not limit the sensitizing dyes used in the present invention.

I-1

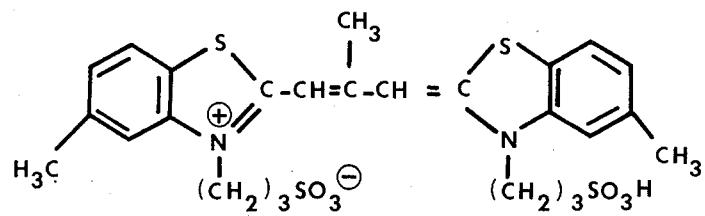

I-2

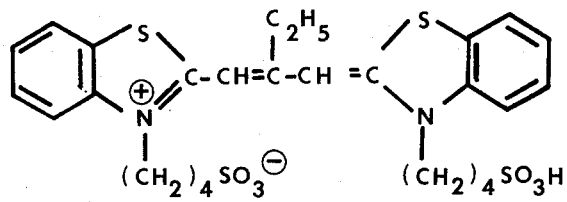

I-3

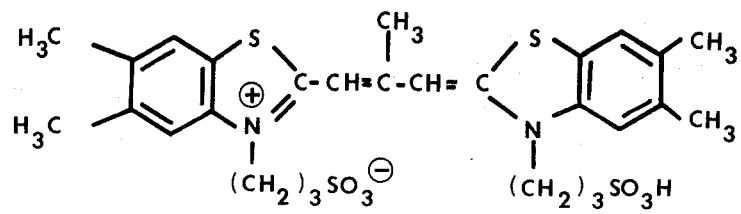

I-4 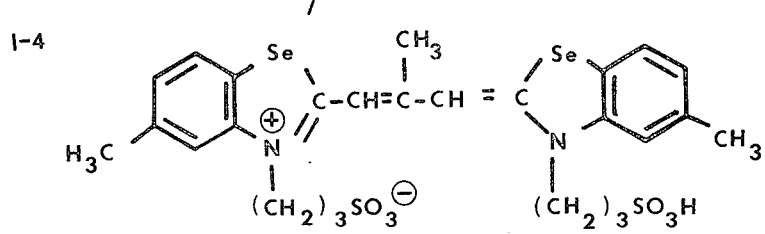
I-5 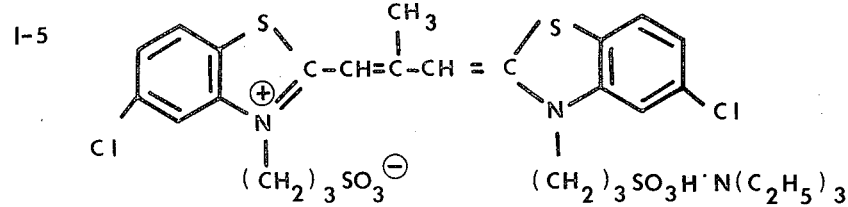
I-6 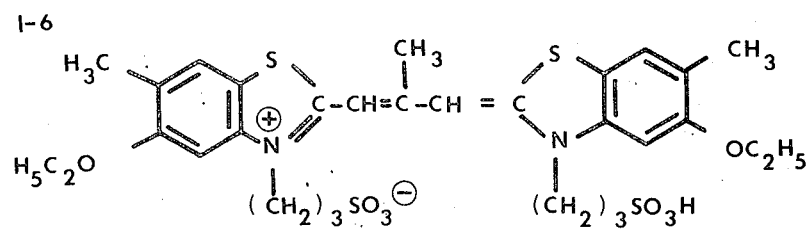
I-7 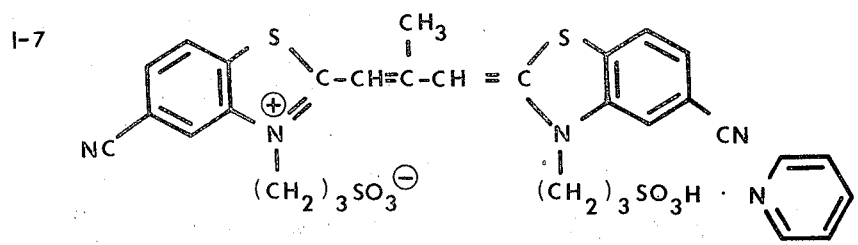
I-8 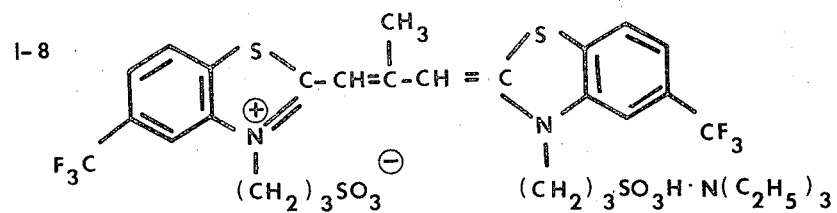
I-9 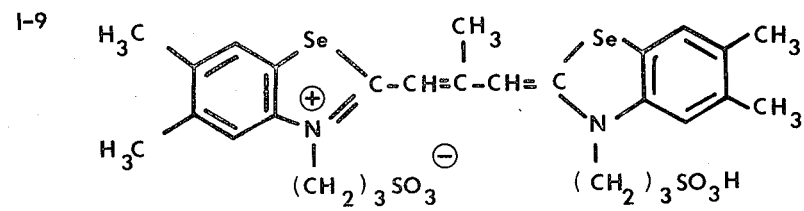
I-10 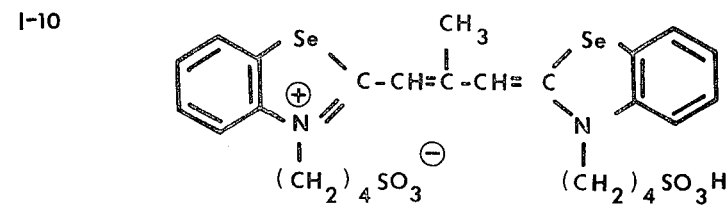

I-11
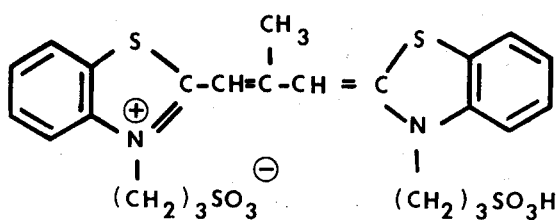
I-12
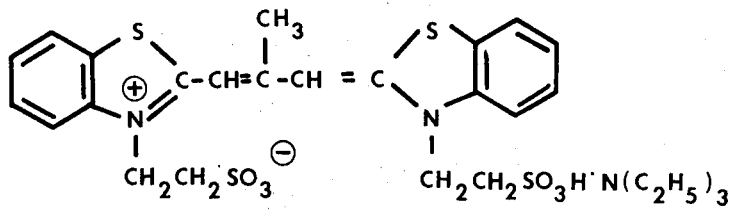
I-13
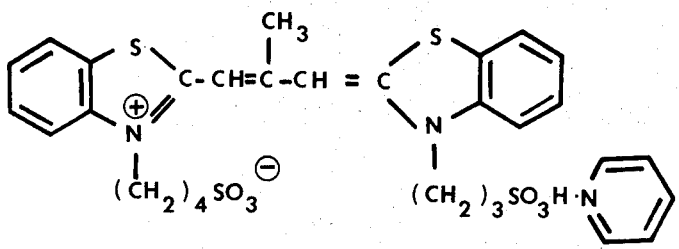
I-14
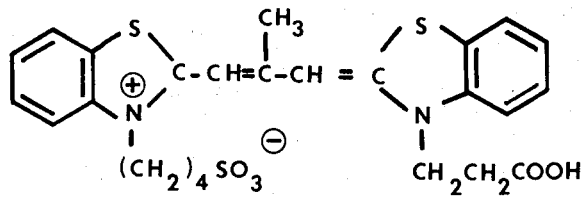
I-15
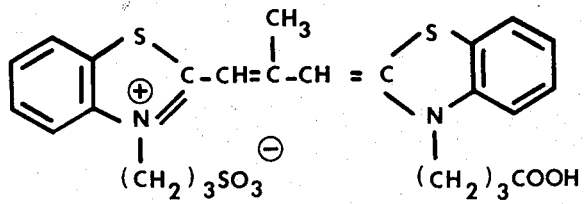
I-16
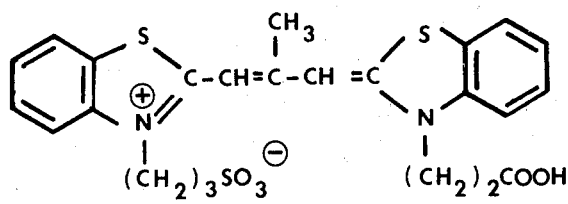

I-17 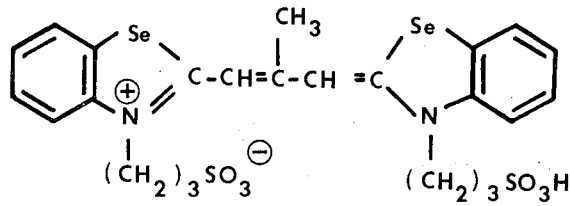
I-18 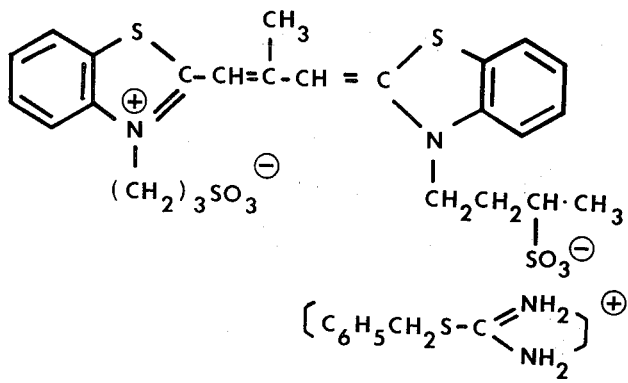
I-19 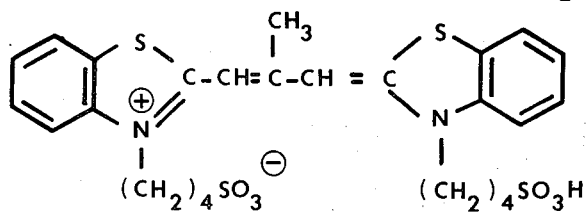
I-20 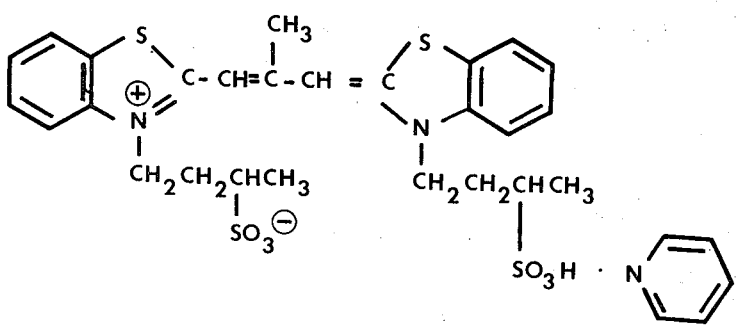
I-21 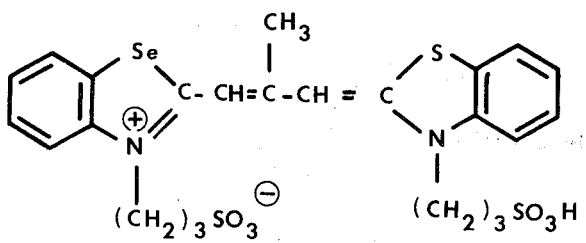
I-22 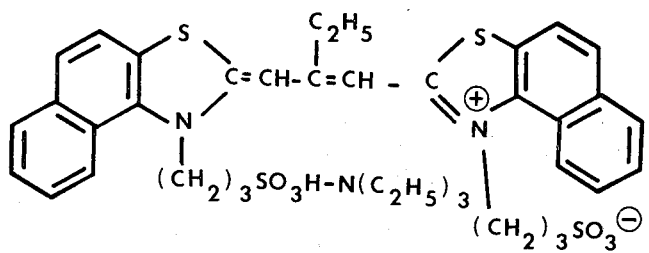

I-23
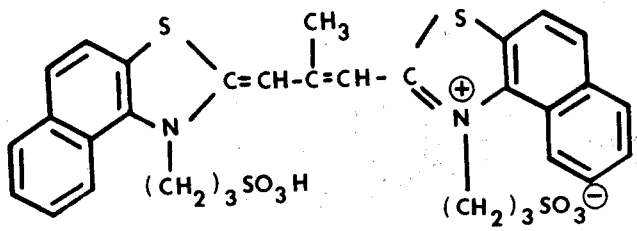
Typical examples of the dyes represented by general formula (II) will now be shown below, which, however, do not limit the sensitizing dyes used in the present invention.
II-1
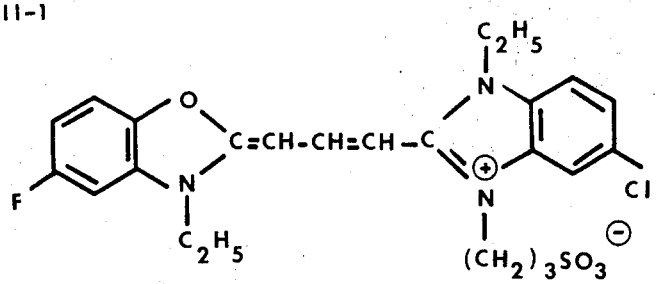
II-2
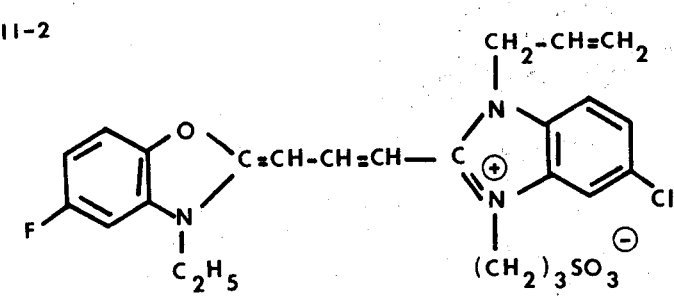
II-3
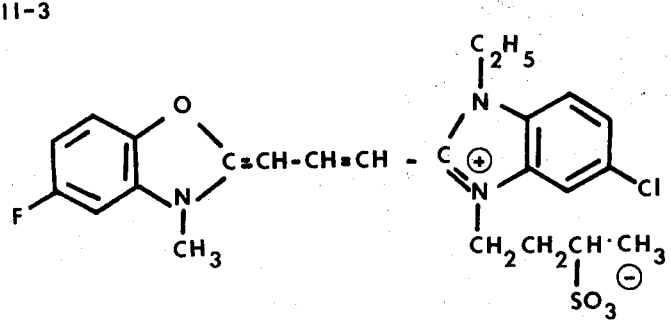
II-4
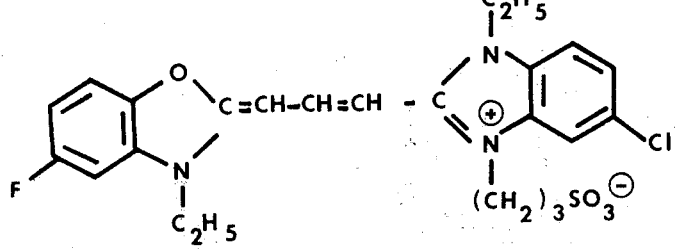

II-5
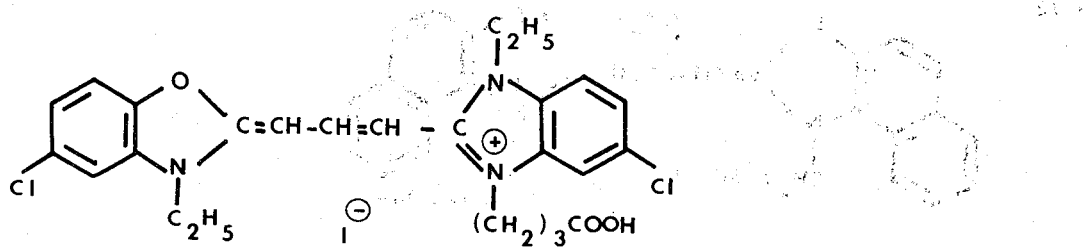
II-6
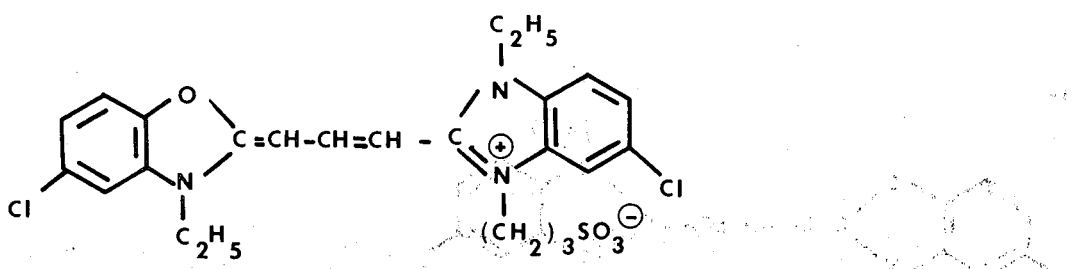
II-7
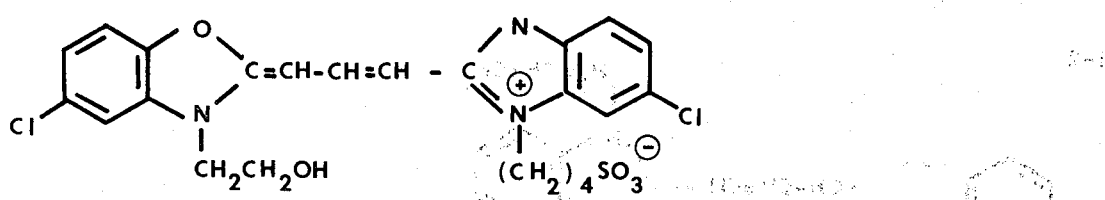
II-8
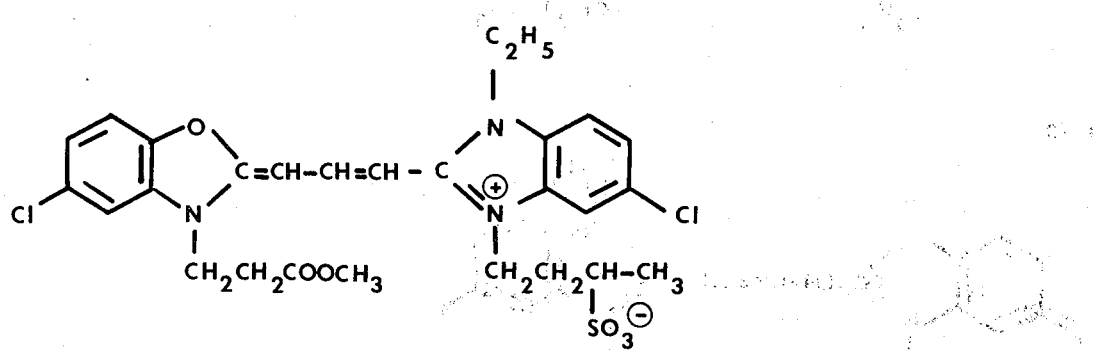
II-9
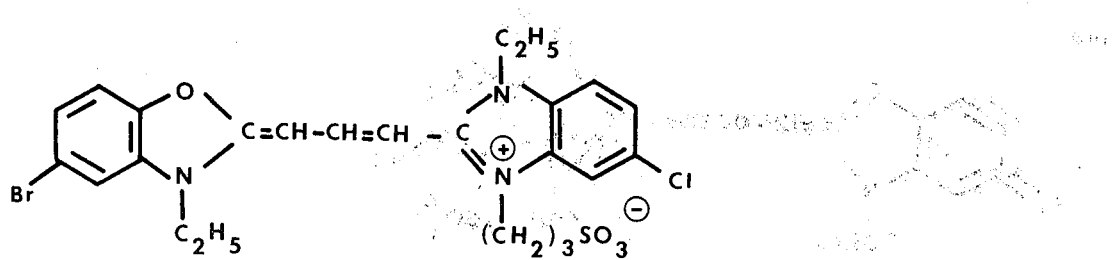

When the sensitizing dye represented by the general formula (I) and the sensitizing dye represented by the general formula (II) are added in combination to a silver halide photographic emulsion, there is provided an ideal spectral sensitization property over the total visible spectral range.

In addition, in a photographic light-sensitive material containing the combination of sensitizing dyes used in the present invention, there remains, after processing, substantially no residual color derived from the sensitizing dyes. In particular, almost no dye is left even in a comparatively rapid processing.

Also, the combination of the sensitizing dyes used in the invention does not have a detrimental interaction with other additives present in a silver halide photographic emulsion, such as anionic compounds, e.g., anti-irradiation dyes having an anionic group such as a sulfo group, gelatin-coagulating (or precipitating) agents having anionic groups such as a carboxyl group, color couplers contained in a light-sensitive emulsion layer, and the like, and has stable photographic characteristics during the storage of light-sensitive materials containing the combination.

One very significant feature of the present invention that the spectral absorption strength in longer wave-length regions due to the sensitizing dye represented by general formula (I) can be increased and, at the same time, spectral sensitivity can be increased, by using the sensitizing dye represented by general formula (II) in combination therewith.

In many cases, spectral absorption wave-lengths (i.e., the longest sensitized wave-length region and the maximum sensitivity wave-length) vary with the increase in spectral absorption.

Figure 2:
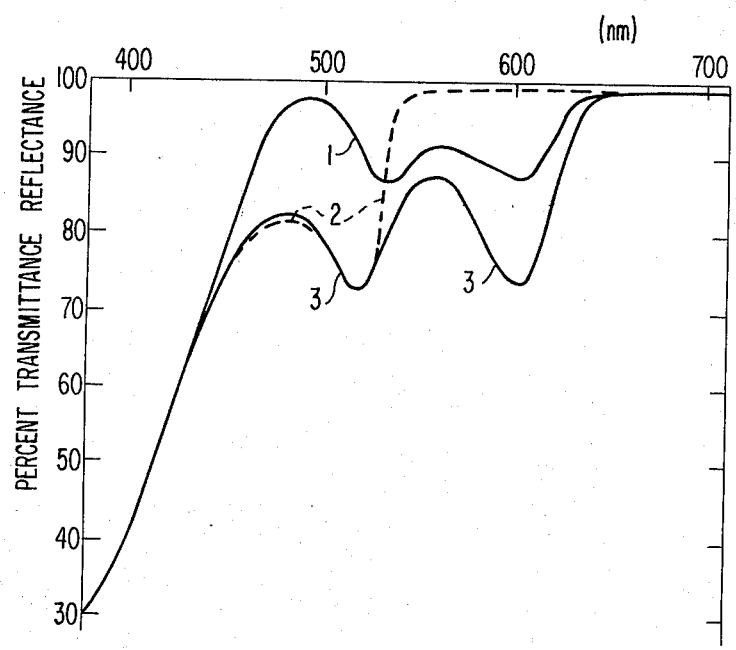
FIG. 2 shows spectral absorption curves of samples prepared by adding dyes to a silver bromoiodide emulsion (I:1.5 mol%) mainly comprising regular grains having a (1 1 1) face and applying to a film, wherein curve 1 is the spectral absorption curve obtained by adding 4 cc of sensitizing dye I-10 to the emulsion (per 100 g) as a solution of $5 \times 10^{-4}$ mol/liter, curve 2 is the spectral absorption curve obtained by adding 4 cc of sensitizing dye II-6 to the emulsion per (100 g) as a solution of $1 \times 10^{-3}$ mol/liter, and curve 3 is the spectral absorption curve obtained by adding 4 cc of sensitizing dye I-10 as a solution of $5 \times 10^{-4}$ and 4 cc of sensitizing dye II-6 as a solution of $1 \times 10^{-3}$ mol/liter to the emulsion (per 100 g).
Figure 3A:
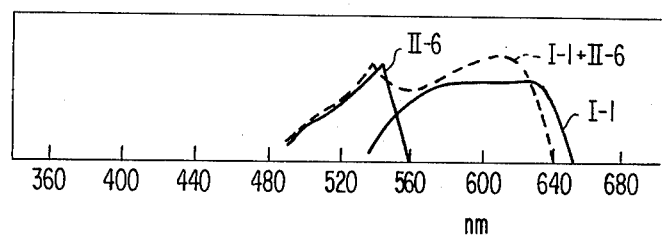
FIG. 3 shows spectral sensitivity curves: wherein (a) shows spectral sensitivity curves of Run No. 1 in Table 2 of the Examples, wherein curve I-I is the spectral sensitivity curve obtained by incorporating dye (I-1) alone at a level of $3.2 \times 10^{-5}$ mol/mol silver halide, curve II-6 is the spectral sensitivity curve obtained by incorporating dye (II-6) alone at a level of $1.2 \times 10^{-4}$ mol/mol silver halide, and curve (I-1 + II-6) is the spectral sensitivity curve obtained by incorporating dye (I-1) and dye (II-6) at levels of $3.2 \times 10^{-5}$ mol/mol silver halide and $1.2 \times 10^{-4}$ mol/mol silver halide, respectively; (b) shows the spectral sensitivity curves of Run No. 3 in Table 3 of the Example, wherein curve I-20 is the spectral sensitivity curve obtained by incorporating dye (I-20) alone at a level of $3.2 \times 10^{-5}$ mol/mol silver halide, curve (I-21 + II-6) is the spectral sensitivity curve obtained by incorporating dye (I-21) and dye (II-6) at levels of $3.2 \times 10^{-5}$ mol/mol silver halide and $1.2 \times 10^{-4}$ mol/mol silver halide, respectively; (c) shows the spectral sensitivity curves of Run No. 6 in Table 3 of the Examples, wherein curve I-C is the spectral sensitivity curve obtained by incorporating dye (I-C) alone at a level of $3.2 \times 10^{-5}$ mol/mol silver halide and curve (I-C + II-6) is the spectral sensitivity curve obtained by incorporating dye (I-C) and dye (II-6) at levels of $3.2 \times 10^{-5}$ mol/mol silver halide and $1.2 \times 10^{-4}$ mol/mol silver halide, respectively; (d) shows the spectral sensitivity curves of Run No. 7 in Table 3 of the Examples, wherein curve (I-D) is the spectral sensitivity curve obtained by incorporating dye (I-D) alone at a level of $3.2 \times 10^{-5}$ mol/mol silver halide, and curve (I-D + II-6) is the spectral sensitivity curve obtained by incorporating dye (I-D) and dye (II-6) at levels of $3.2 \times 10^{-5}$ mol/mol silver halide, and $1.2 \times 10^{-4}$ mol/mol silver halie, respectively.
Figure 3B:
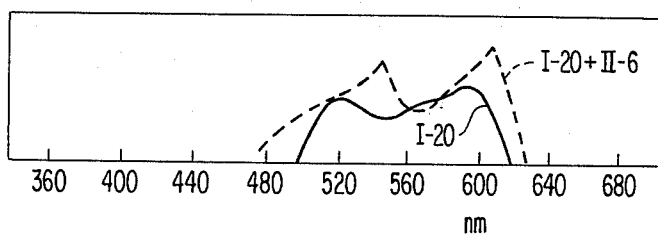
Figure 3C:
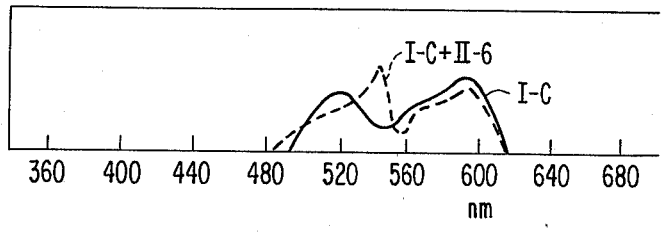
Figure 3D:
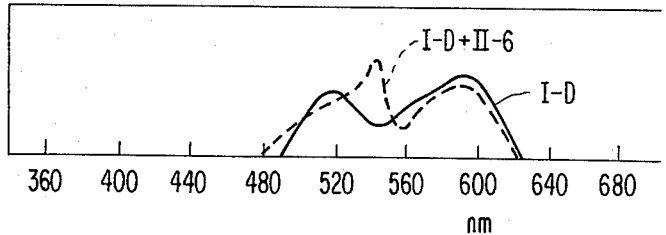

Spectral absorption curves are shown in FIGS. 1 and 2.

The chemical structural features of the sensitizing dyes used in the invention represented by general formula (I) are described hereinafter.

1. In the sensitizing dyes represented by the general formula (I), $R_1$ and $R_2$ each represents an alkyl group containing a carboxyl group or an alkyl group containing a sulfo group, at least one of $R_1$ and $R_2$ being an alkyl group containing a sulfo group.

Dyes having as substituents $R_1$ and $R_2$ only well known unsubstituted alkyl groups such as methyl, ethyl, etc., do not exert a supersensitizing action when used together with the sensitizing dye represented by general formula (II). In many cases, the light sensitivity in longer wave-length regions will be reduced by the combined use of these two dyes.

2. Of the sensitizing dyes represented by general formula (I), those wherein $R_o$ is an hydrogen atom are well known. However, these dyes do not exhibit a supersensitizing action when used together with the sensitizing dyes represented by general formula (II). Dyes wherein $R_o$ is a lower alkyl group are effective and, particularly, dyes having a methyl group as the substituent $R_o$ are effective.

3. Of the sensitizing dyes represented by general formula (II), those wherein substituent Y on a heterocyclic nucleus is a hydrogen atom, an alkyl group or an alkoxy group are well known. However, these dyes do not exhibit a supersensitizing action when used together with the dyes represented by general formula (I). Those wherein Y represents a halogen, particularly a chlorine atom, are effective.

4. Of the sensitizing dyes represented by general formula (II), those wherein substituent $R_4$ is a lower alkyl group, a hydroxyalkyl group or an acetoxyalkyl group are particularly effective.

5. Of the dyes represented by general formula (II), those having as the N-substituent ($R_5$) an alkyl group are well known and do not exhibit a supersensitizing action when used together with the dyes represented by general formula (I), and those wherein $R_5$ is an alkyl group containing a carboxyl or sulfo group, particularly an alkyl group containing a sulfo group, are effective.

Various effects obtained by the invention should be construed as provided by a super-addition of the features of the above-described dyes represented by general formulae (I) and (II) (i.e., not a mere "sum" of the individual features but a "superadditive" effect).

Dyes represented by general formula (II) are described in, for example, Japanese Pat. No. 14030/69, etc., and can readily be synthesized by those skilled in the art referring to the above-described patent. Those not described therein can be synthesized in a similar manner by varying the starting materials.

Dyes represented by general formula (I) are described in, for example, U.S. Pat. Nos. 2,503,776; 3,459,553 and 3,177,210; British Pat. Nos. 1,128,840 and 1,137,084; West German Pat. Nos. 1,929,037 and 1,811,542; French Pat. No. 1,573,694, etc., and can readily be synthesized by those skilled in the art referring to the above-described patents. Those not specifically described therein can be synthesized in a similar manner by varying the starting materials. All the starting materials are easily available or easily synthesized by one skilled in the art.

As the silver halide used in the emulsion of the present invention, any light-sensitive one such as silver chloride, silver bromide, silver iodide, silver chlorobromide, silver bromoiodide preferably having a halogen composition no greater than 10 mole % iodide, silver chlorobromoiodide, etc. can be used.

The grain size of the silver halides used in the present invention can be in the range of from fine grains to ordinary sizes. It is not particularly limited and can be, e.g., an ordinary size of more than ca. 0.6 $\mu$ or fine grains of less than ca. 0.2 $\mu$.

The crystal system and the crystal habit of silver halide grains used are not particularly limited.

Silver halide grains comprising a (1 1 1) face are well known and are of course useful for sensitization in the present invention, and grains having a (1 0 0) face are particularly useful.

The measurement of the crystal habit is well known in this field (e.g., measured by photographing grains with an electron microscope).

The present invention is, of course, useful for the sensitization of irregular grains. In addition, in the case of using the grains for microfilms, the sensitization of regular grains is particularly useful. Of the regular grains, regular silver bromoiodide or silver bromide grains having a (1 0 0) surface are particularly useful for sensitization. Those substantially cubic silver halide grains in particular are effectively used in the present invention. A process for producing emulsions containing cubic and regular silver halide grains having a (1 0 0) face is described in British Pat. No. 1,156,193, etc.

It is not necessary to change the silver and/or hydrogen ion concentration(s) in sensitization in accordance with the present invention, i.e., the emulsion as they are commonly prepared can be used.

Of the silver chlorobromide emulsions, the emulsions to which a water-soluble iodide (e.g., in an amount of 0.005–0.10 mol per mol of silver halide constituting the AgCl) or a water-soluble bromide (in an amount of, e.g., 0.01 – 0.20 mol per mol of silver halide constituting the AgCl) has been added after the formation of the silver halide are particularly advantageously used.

In the present invention, normally a gelatine-silver halide emulsion is used. However, gelatin can be replaced by other binders which do not exert a detrimental effect on a light-sensitive silver halide, such as modified gelatins such as phthalated gelatin and malonated gelatin, albumin, agar-agar, gum arabic, alginic acid, hydrophilic resins (e.g., polyvinyl alcohol, pholvinyl pyrrolidone, polyacrylamide, polystyrenesulphonate, etc.), modified celluloses such as hydroxyethylcellulose and carboxymethylcellulose, or water-soluble starches such as dextrin. The ratio by weight of silver to binder is preferred to be within the range of from about 1:4 to about 4:1, but this is not limitative.

Dyes represented by the general formulae (I) and (II) can be used in various concentrations depending upon the type of emulsion, concentration of silver halide, desired effects, etc.

The optimal concentration of the sensitizing dyes can be determined according to a known manner by dividing the same emulsion into portions, incorporating dyes in different concentrations into each portion, and measuring the sensitivity thereof. The optimal concentration of the supersensitization combination in accordance with the invention can also be determined with ease according to a similar method, i.e., by incorporating the combination of dyes in a series of test portions of the same emulsion and changing the concentration in the emulsion.

The sensitizing dyes are added to an emulsion in a manner well known in the art. The sensitizing dyes can be directly dispersed in an emulsion or can be added in the form of a solution by dissolving them in a solvent such as pyridine, methyl alcohol, ethyl alcohol, methyl cellosolve, acetone, etc. (or a mixture thereof), which solution may in some cases be diluted with water, or, in some cases, they can be dissolved in water alone.

In addition, ultrasonic vibrations can be applied to assist dissolving. The methods described in, e.g., Japanese Pat. Nos. 8231/70; 23389/69; 27555/69 and 22948/69; U.S. Pat. No. 3,485,634; German Pat. OLS No. 1,947,935; U.S. Pat. Nos. 3,342,605 and 2,912,343, etc., can be employed.

If desired, the sensitizing dyes can be separately dissolved in a suitable solvent and added separately to an emulsion, or they can be dissolved in the same or different solvents and mixed prior to the addition thereof to the silver halide emulsion. The latter method is particularly advantageous for obtaining high sensitization.

It is necessary to uniformly disperse the dyes throughout an emulsion prior to applying the emulsion with the sensitizing dyes to a suitable support such as a glass plate, cellulose derivative (e.g., cellulose triacetate, etc.) film, polyvinyl resin film (e.g., polystyrene film, polyvinyl chloride film, etc.), polyester (e.g., polyethylene terephthalate, etc.) film, synthetic paper, baryta paper, polyolefin-laminated photographic paper, and the like.

These sensitizing dyes can be added to an emulsion at any stage during the steps of producing the emulsion, but it is convenient to add them after the completion of second ripening.

The proportion of the sensitizing dyes represented by general formulae (I) and (II) need only be set so as to be in a supersensitizing amount, i.e., the ratio of the sensitizing dye represented by the general formula (I) to the sensitizing dye represented by the general formula (II) is not particularly limited, and usually a range of from about 9:1 to about 1:9 in weight ratio is particularly effective. The ratio can be varied depending upon the end use. The amounts of the sensitizing dyes used can be varied depending upon the properties of the individual silver halide emulsion used, desired effects and the like.

In general, it is sufficient to incorporate each dye in an amount of from about $1 \times 10^{-6}$ to about $5 \times 10^{-3}$ mol per gram molecule of silver halide so as to obtain optimal sensitization.

The photographic emulsion used in the invention can be chemically sensitized with a noble metal sensitizing agent (e.g., potassium chloroaurate, aurous thiosulfate, potassium chloropalladate, etc.; as disclosed, for example, in U.S. Pat. Nos. 2,340,085, 2,597,856, 2,597,915 and 2,399,083), a sulfur sensitizing agent (e.g., allyl thiocarbamide, thiourea, sodium thiosulfate, cystine, etc.; as disclosed, for example, in U.S. Pat. Nos. 1,574,944, 2,278,947, 2,440,206, 2,410,689, 3,189,458 and 3,415,649), a reduction sensitizing agent (e.g., stanuous chloride, phenylhydrazine, etc.; as disclosed, for example, in U.S. Pat. Nos. 2,518,698, 2,419,974 and 2,983,610), sensitizing agent of the polyalkylene oxide series such as polyoxyethylene derivatives and polyoxypropylene derivatives, etc.

In addition, if desired, an anti-fogging agent such as nitrobenzimidazole and ammonium chloroplatinate, a stabilizing agent such as 4-hydroxy-6-methyl-1,3,3a,7-tetrazaindene, a hardener such as formaldehyde, chromialum, sodium 1-hydroxy-3,5-dichlorotriazine, glyoxal and dichloroacrolein, a coating aid such as saponin and sodium alkylbenzene-sulfonate, a plasticizer, development accelerator, aerial fog-preventing agent and the like can be incorporated in the emulsion.

The silver halide photographic emulsion having incorporated therein the combination of sensitizing dyes used in the invention can be used for various light-sensitive materials. That is, it can be used for a photographic light-sensitive material for use in copying such as a microfilm; as a negative light-sensitive material for general use; as a light-sensitive material for plate-making; as a light-sensitive material for use in television or a like negative material; as a light-sensitive material for a spectrogram; as a light-sensitive material for astronomical use; as a light-sensitive material for aerial photography; as a light-sensitive material having high resolving power; as a light-sensitive material for use in the diffusion transfer process; and the like.

The present invention will now be described in greater detail by several non-limiting examples of preferred embodiments.

EXAMPLE 1

Gelatino silver bromoiodide (1.5 mole % iodide content and silver:binder = 1:1 by weight) emulsions sensitized with 30 mg of hypo and 40 mg of hydrogen tetrachloroaurate based on 100 g of the emulsion (containing spectral sensitizing dyes) were prepared in a usual manner (pH of 6.5 and pAg of 8.5), and applied to a film support. The sensitizing dyes were added to the emulsions by dissolving in methanol.

The above-described coated films were exposed according to the method described in JjS (1/20 second, 5000 Lux, tungsten light having a color temperature of 2854°K), and then subjected to development processing at 31°C for 1 minute in a developer having the following composition to thereby measure the sensitivity of each sample. The results thus obtained are shown in Table 1.

| Formulation of the developer: | |
|---|---|
| Metol | 4 g |
| Anhydrous sodium sulfite | 60 g |
| Hydroquinone | 10 g |
| Sodium carbonate monohydrate | 52.7 g |
| Potassium bromide | 2.5 g |
| Water to make | 1 liter |

(The silver bromoiodide emulsions used were substantially completely silver halide grains having a (1 0 0) face and having a mean grain size of about 0.3 $\mu$ (determined by measuring projected area)).

TABLE 1

| Sensitizing dye | Amount added ($\times 10^{-5}$ mol/mol silver halide) | Sensitizing dye | Amount added ($\times 10^{-4}$ mol/mol silver halide) | Relative sensitivity* White light | Relative sensitivity* Yellow light | Relative sensitivity* Blue light | Observed density due to dye remaining after development |
|---|---|---|---|---|---|---|---|
| I-13 | 3.2 | — | — | 100 | 83.5 | 3.0 | 0.01 |
| " | " | II-1 | 2.0 | 152 | 127 | 3.15 | 0.01 |
| " | " | II-2 | 2.0 | 159 | 133 | 3.15 | 0.01 |
| " | " | II-3 | 2.0 | 152 | 127 | 3.2 | 0.01 |
| " | " | II-4 | 1.6 | 145 | 121 | 3.1 | 0.01 |
| " | " | II-5 | 1.6 | 167 | 139 | 3.45 | 0.01 |
| " | " | II-6 | 1.6 | 174 | 145 | 3.45 | 0.01 |
| " | " | II-7 | 1.6 | 170 | 142 | 3.5 | 0.01 |
| " | " | II-8 | 1.2 | 149 | 136 | 3.3 | 0.01 |
| " | " | II-9 | 2.0 | 155 | 118 | 3.0 | 0.01 |
| " | 12 | — | — | 152 | 115 | 3.0 | 0.02 |
| " | 16 | — | — | 135 | 113 | 3.0 | 0.02 |
| " | 8 | — | — | 132 | 110 | 3.0 | 0.01 |

*Relatively expressed taking the white light sensitivity of the emulsion containing dye I-13 (in an amount of 3.2 $\times 10^{-5}$ mol/mol silver halide) alone as 100.

As is clear from Table 1, the combined use of the dye represented by general formula (I) and the dye represented by general formula (II) provides higher sensitivity (to both white light and yellow light) as compared with the case of using the sensitizing dye represented by the general formula (I) alone. When dyes are added, the blue sensitivity is usually reduced. However, the combination of the dyes of the present invention raises the blue sensitivity.

Table 2 presents data for elements formed and processed identical to those in Example 1 except for altering the dye used as shown in Table 2.

TABLE 2

| Run No. | Sensitizing dye | Amount added ($\times 10^{-5}$ mol/mol silver halide) | Sensitizing dye | Amount added ($\times 10^{-4}$ mol/mol silver halide) | Relative sensitivity** White light | Relative sensitivity** Blue light |
|---|---|---|---|---|---|---|
| 1 | I-1 | 3.2 | — | — | 100 | 2.5 |
| | " | " | II-6 | 1.2 | 187 | 2.5 |
| | " | 8 | — | — | 135 | 2.5 |
| | " | 12 | — | — | 132 | 2.5 |
| | — | — | II-6 | 1.2 | 97.5 | 2.5 |
| | — | — | " | 1.6 | 87.2 | 2.5 |
| 2 | I-2 | 6 | — | — | 100 | 1.6 |
| | " | " | II-6 | 1.2 | 166 | 1.6 |
| | " | 8 | — | — | 148 | 1.6 |
| | " | 12 | — | — | 142 | 1.6 |
| 3 | I-3 | 3.2 | — | — | 100 | 2.5 |
| | " | " | II-6 | 1.2 | 162 | 2.5 |
| | " | 8 | — | — | 132 | 2.5 |
| | " | 12 | — | — | 132 | 2.5 |
| 4 | I-4 | 3.2 | — | — | 100 | 2.5 |
| | " | " | II-6 | 1.2 | 174 | 2.5 |
| | " | 8 | — | — | 145 | 2.5 |
| | " | 12 | — | — | 143 | 2.5 |
| 5 | I-5 | 6 | — | — | 100 | 2.5 |
| | " | " | II-6 | 1.2 | 235 | 2.5 |
| | " | 8 | — | — | 148 | 2.5 |
| | " | 12 | — | — | 146 | 2.5 |
| 6 | I-7 | 6 | — | — | 100 | 2.5 |
| | " | " | II-6 | 1.2 | 170 | 2.5 |
| | " | 8 | — | — | 145 | 2.5 |
| | " | 12 | — | — | 145 | 2.5 |
| 7 | I-8 | 6 | — | — | 100 | 2.5 |
| | " | " | II-6 | 1.2 | 200 | 2.5 |
| | " | 8 | — | — | 146 | 2.5 |
| | " | 12 | — | — | 142 | 2.5 |
| 8 | I-11 | 3.2 | — | — | 100 | 2.5 |
| | " | " | II-6 | 1.2 | 200 | 2.5 |
| | " | 8 | — | — | 159 | 2.5 |
| | " | 12 | — | — | 152 | 2.5 |
| 9 | I-14 | 3.2 | — | — | 100 | 2.5 |
| | " | " | II-6 | 1.2 | 145 | 2.5 |
| | " | 8 | — | — | 115 | 2.5 |
| | " | 12 | — | — | 112 | 2.5 |
| 10 | I-18 | 3.2 | — | — | 100 | 2.5 |
| | " | " | II-6 | 1.2 | 204 | 2.5 |
| | " | 8 | — | — | 120 | 2.5 |
| | " | 12 | — | — | 118 | 2.5 |
| 11 | I-21 | 3.2 | — | — | 100 | 2.5 |
| | " | " | II-6 | 1.2 | 174 | 2.5 |
| | " | 8 | — | — | 135 | 2.5 |
| | " | 12 | — | — | 135 | 2.5 |
| 12 | I-22 | 3.2 | — | — | 100 | 2.5 |
| | " | " | II-6 | 1.2 | 155 | 2.5 |
| | " | 8 | — | — | 132 | 2.5 |

TABLE 2-continued

| Run No. | Sensitizing dye | Amount added ($\times 10^{-5}$ mol/mol silver halide) | Sensitizing dye | Amount added ($\times 10^{-4}$ mol/mol silver halide) | Relative sensitivity** White light | Blue light |
|---|---|---|---|---|---|---|
| | " | 12 | — | — | 129 | 2.5 |

**With respect to Run Nos. 1,3,4,8 – 12, the relative sensitivity is expressed taking the sensitivity obtained by incorporating each dye alone in the emulsion in an amount of $3.2 \times 10^{-5}$ mol/mol silver halide as 100; with respect to Run Nos. 2, 5 – 7, the relative sensitivity is relatively expressed taking the sensitivity obtained by incorporating each dye alone in an amount of $6 \times 10^{-5}$ mol/mol silver halide as 100.

From Table 2, it can be seen that white light sensitivity can be markedly increased by the combination of the dyes of the invention, and that no reduction in blue light sensitivity is caused by their combined use.

EXAMPLE 2

Gelatino silver bromoiodide (2.0 mole % iodide content and silver:binder = 1:1 by weight) emulsions sensitized with 20 mg of hypo and 30 mg of hydrogen tetrachloroaurate based on 100 g of the emulsion (containing spectral sensitizing dyes) were prepared in a standard manner (pH=6.5; pAg=8.5), and applied to a film support. The sensitizing dyes were added to the emulsions by dissolving them in methanol. The silver bromoiodide emulsions used were substantially completely silver halide grains having a (1 0 0) face and having a mean grain size of about 0.2 micron (determined by measuring the projected area).

The above-described coated films were exposed according to the same method as described in Example 1, and then subjected to development processing at 20°C for 4 minutes in a developer having the following composition to thereby measure the sensitivity. The results obtained are shown in Table 3.

| Formulation of the developer: | |
|---|---|
| Metol | 1.0 g |
| Anhydrous sodium sulfite | 75.0 g |
| Hydroquinone | 9.0 g |
| Sodium carbonate monohydrate | 30.0 g |
| Potassium bromide | 5.0 g |
| Water to make | 1 liter |

TABLE 3

| Run No. | Sensitizing dye | Amount added ($\times 10^{-5}$ mol/mol silver halide) | Sensitizing dye | Amount added ($\times 10^{-4}$ mol/mol silver halide) | Relative sensitivity White light | Red light |
|---|---|---|---|---|---|---|
| 1 | I-10 | 3.2 | — | — | 100 | 89.2 |
| | " | " | II-6 | 1.2 | 163 | 155 |
| | " | 8 | — | — | 108 | 96.0 |
| | " | 12 | — | — | 105 | 93.7 |
| 2 | I-J (for comparison) | 3.2 | — | — | 100 | 91.2 |
| | " | " | II-6 | 1.2 | 155 | 102 |
| | " | 8 | — | — | 148 | 132 |
| | " | 12 | — | — | 148 | 135 |
| 3 | I-20 | 3.2 | — | — | 100 | 91.2 |
| | " | " | II-6 | 1.2 | 214 | 200 |
| | " | 8 | — | — | 148 | 135 |
| | " | 12 | — | — | 145 | 132 |
| 4 | I-A (for comparison) | 3.2 | — | — | 100 | 85.2 |
| | " | " | II-6 | 1.2 | 145 | 79.5 |
| | " | 8 | — | — | 170 | 147 |
| | " | 12 | — | — | 156 | 135 |
| 5 | I-B (for comparison) | 3.2 | — | — | 100 | 87.2 |
| | " | " | II-6 | 1.2 | 159 | 96.0 |
| | " | 8 | — | — | 152 | 132 |
| | " | 12 | — | — | 148 | 129 |
| 6 | I-C | 3.2 | — | — | 100 | 85.2 |
| | " | " | II-6 | 1.2 | 93.3 | 69.5 |
| | " | 8 | — | — | 115 | 98.0 |
| | " | 12 | — | — | 115 | 98.0 |
| 7 | I-D (for comparison) | 3.2 | — | — | 100 | 91.2 |
| | " | " | II-6 | 1.2 | 95.5 | 72.5 |
| | " | 8 | — | — | 141 | 128 |
| | " | 12 | — | — | 138 | 126 |
| 8 | I-E (for comparison) | 3.2 | — | — | 100 | 76 |
| | " | " | II-6 | 1.2 | 204 | 59 |
| | " | 8 | — | — | 289 | 220 |
| | " | 12 | — | — | 282 | 220 |
| 9 | I-F (for comparison) | 3.2 | — | — | 100 | 91.2 |
| | " | " | II-6 | 1.2 | 95.5 | 81.5 |
| | " | 8 | — | — | 115 | 105 |
| | " | 12 | — | — | 112 | 102 |
| 10 | I-G (for comparison) | 3.2 | — | — | 100 | 76.0 |
| | " | " | II-6 | 1.2 | 246 | 57.7 |
| | " | 8 | — | — | 263 | 210 |
| | " | 12 | — | — | 263 | 212 |
| 11 | I-H (for comparison) | 3.2 | — | — | 100 | 85.1 |
| | " | " | II-6 | 1.2 | 100 | 74.2 |
| | " | 8 | — | — | 118 | 100 |
| | " | 12 | — | — | 115 | 97.8 |

In the above Table, sensitizing dyes I-A, I-B, I-C, I-D, I-E, I-F, I-G, I-H, I-J, (later identified) are dyes for comparison. The white light sensitivity obtained by incorporating each of the sensitizing dyes (represented by the I- series) alone at a level of $3.2 \times 10^{-5}$ mol/mol silver halide was taken as 100.

When $R_o$ in the general formula (I) is a lower alkyl group (in this example, a methyl group), dyes having as substituents $R_1$ and $R_2$ ethyl groups (I-D), hydroxyethyl groups (I-C), or carboxyalkyl groups (I-A, I-B and I-J) suffer a reduction in red sensitivity due to the dye of the present invention represented by general formula (II) (II-6) or, even when the red sensitivity is raised, the degree of raising is small.

On the other hand, in the combination of the present invention, of dye (I-10) or (I-21) with dye (II-6), both the white light sensitivity and the red light sensitivity are markedly increased, and there can be obtained a far higher sensitivity than is obtained by using the dyes independently.

In addition, it is clear from Table 3 that the red sensitivity obtained using dye I-E or I-G (corresponding to the dye represented by the general formula (I) wherein $R_o$ is a hydrogen atom) together with dye (II-6) is greatly reduced as compared with that obtained using them independently.

Sensitizing dyes for comparison:

I-A
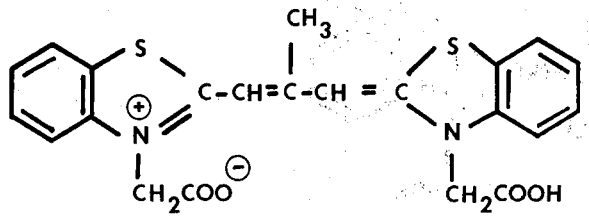
I-B
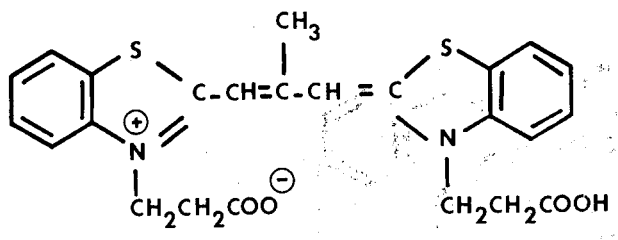
I-C
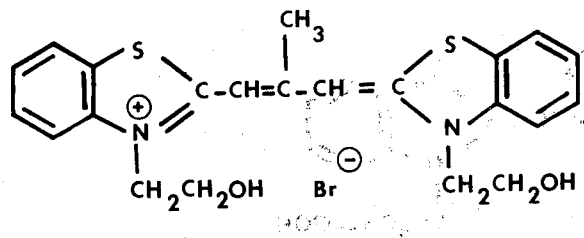
I-D
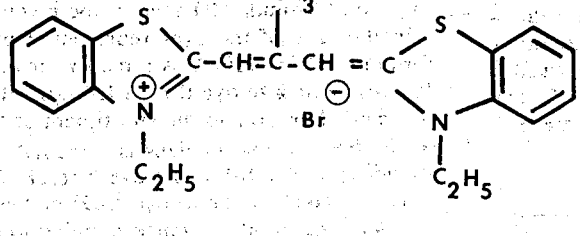
I-E
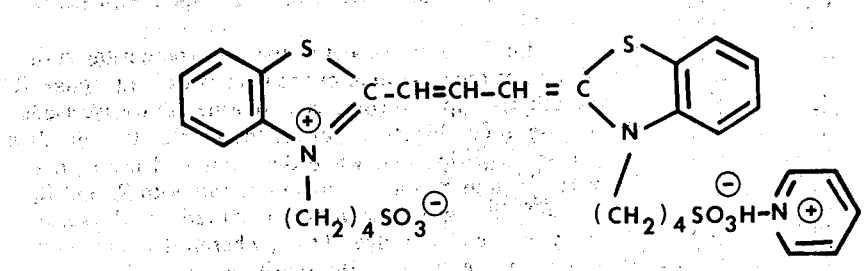
I-F
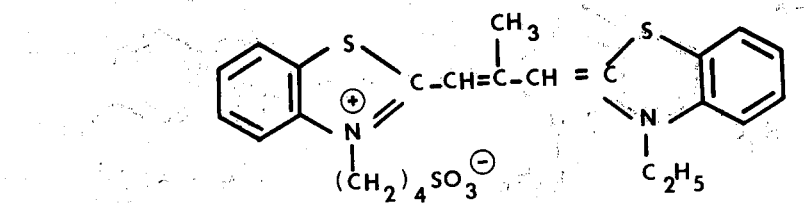

I-G

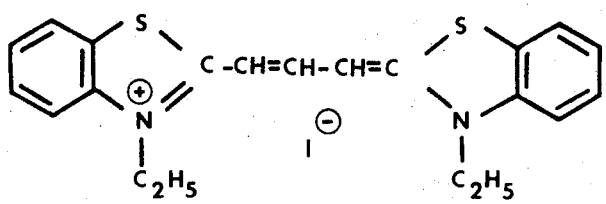

I-H

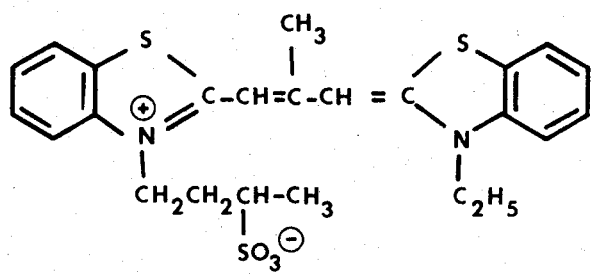

I-J

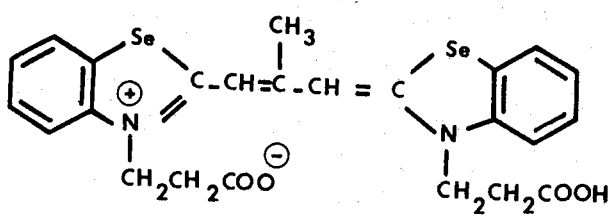

EXAMPLE 3

The same emulsions as were used in Example 1 were again prepared except that the dyes given in Table 4 were used and the emulsions applied to a support to prepare samples as in Example 1. The relative sensitivity was determined under the same conditions of exposure, processing and measurement as in Example 1. The results obtained are shown in Table 4.

TABLE 4

| Sensitizing dye | Amount added ($\times 10^{-5}$ mol/mol silver halide) | Sensitizing dye | Amount added ($\times 10^{-4}$ mol/mol silver halide) | Relative sensitivity | |
|---|---|---|---|---|---|
| | | | | White light | Yellow light |
| I-13 | 2.8 | — | — | 100 | 83.5 |
| " | " | II-6 | 2.0 | 178 | 148 |
| " | " | II-A* | 2.0 | 105 | 83.5 |
| " | " | II-B* | 2.0 | 91.2 | 72.9 |
| " | " | II-C* | 2.0 | 81.5 | 68.2 |
| " | " | II-D* | 2.0 | 87.1 | 71.2 |
| " | " | II-E* | 2.0 | 97.6 | 81.7 |
| " | " | II-F* | 2.0 | 93.3 | 76.3 |
| " | " | II-H* | 2.0 | 69.3 | 52.8 |
| " | " | II-I* | 2.0 | 97.6 | 74.6 |

*Dyes for comparison

In the above Table, (II-A) to (II-I) are dyes for comparison having a chemical structural formula analogous to general formula (II) used in the invention.

In the case of the dyes represented by the general formula (II) wherein Y is a methyl or methoxy group (corresponding to dye II-A or II-b), the dye wherein Y is a methyl group and the substituent at the 6-position of the benzoxazole nucleus is a methyl group (corresponding to dye II-C), the dye wherein Y is a phenyl group (corresponding to dye II-D) or the dye wherein Y is a hydrogen atom (corresponding to dye II-E, II-F or II-G), when used together with dye (I-13), the sensitivity (at least the yellow sensitivity) by dye (I-13) is reduced.

In addition, with respect to the dye wherein the substituent at the 6-position of the benzoxazole nucleus is a methyl group, though Y is a chlorine atom (dye II-I) the use in combination reduces the sensitivity.

It is surprizing that while the combined use of dye II-H, wherein Y is a chlorine atom and both $R_4$ and $R_5$ are sulfoalkyl groups, and dye (I-13) reduces the sensitivity of dye (I-13), dye (11-6), wherein $R_4$ is an alkyl group, markedly raises the sensitivity.

Sensitizing dyes for comparison:

II-A

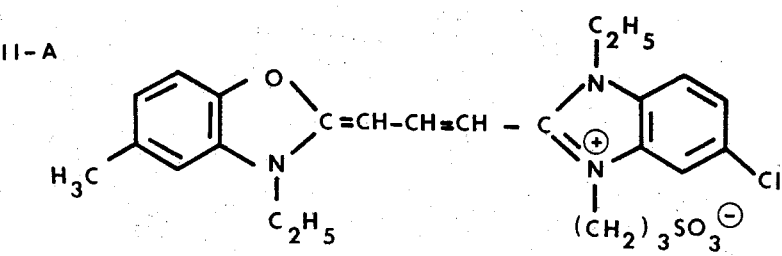

11-B
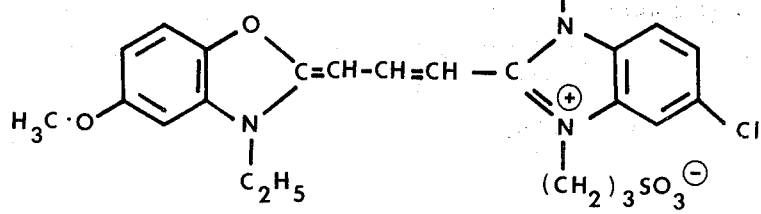
11-C
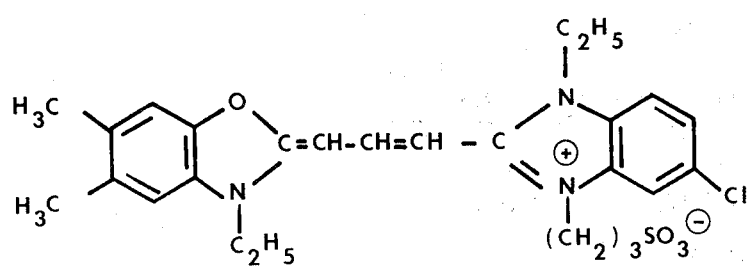
11-D
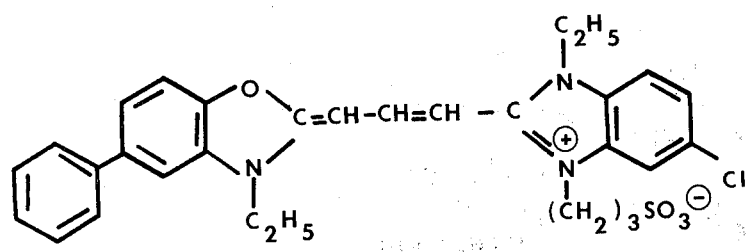
11-E
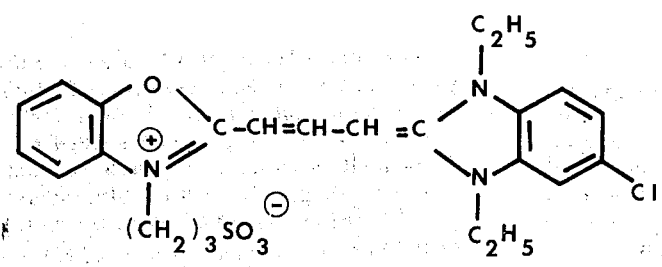
11-F
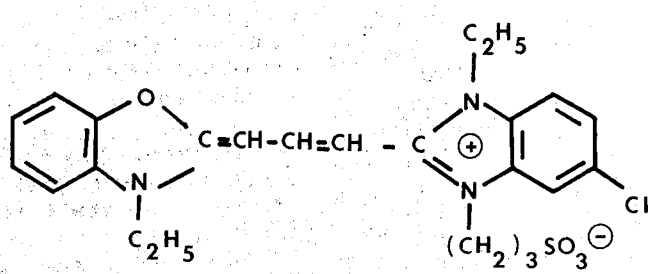
11-G
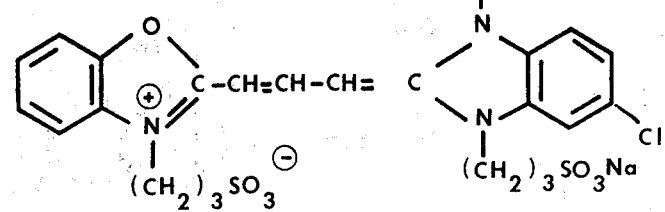

II-H

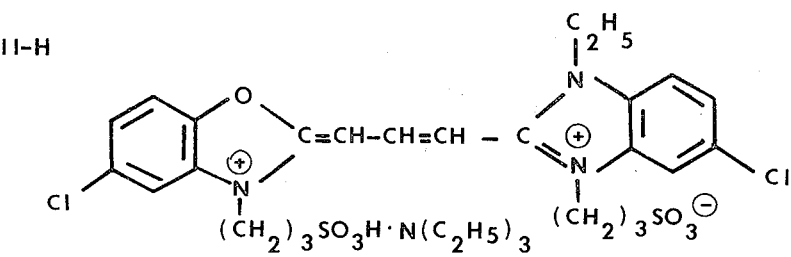

II-I

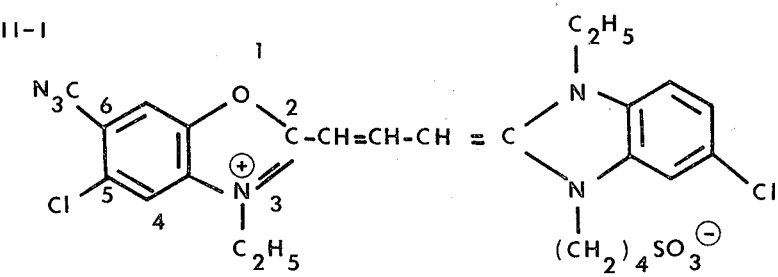

EXAMPLE 4

Emulsions the same as were used in Example 1 were prepared except that the dyes given in Table 5 were used, and they were applied to a support to prepare samples as in Example 1. The relative sensitivity was determined under the same conditions of exposure, processing and measurement as in Example 1. The results obtained are shown in Table 5.

TABLE 5

| Sensitizing dye | Amount added ($\times 10^{-5}$ mol/mol silver halide) | Sensitizing dye | Amount added ($\times 10^{-4}$ mol/mol silver halide) | Relative sensitivity | |
|---|---|---|---|---|---|
| | | | | White light | Yellow light |
| I-17 | 3.2 | — | — | 100 | 88.2 |
| " | " | II-6 | 1.6 | 200 | 178 |
| " | " | III-A* | 1.6 | 79.5 | 67.0 |
| " | " | III-B* | 1.6 | 93.5 | 64.9 |
| " | " | III-C* | 1.6 | 70.8 | 62.5 |
| " | " | III-D* | 1.6 | 55.0 | 30.7 |
| " | " | III-E* | 1.6 | 63.2 | 39.5 |
| " | " | III-F* | 1.6 | 46.9 | 30.7 |
| " | " | III-G* | 1.6 | 79.5 | 65.7 |
| " | " | III-H* | 1.6 | 76.0 | 47.5 |

TABLE 5 -continued

| Sensitizing dye | Amount added ($\times 10^{-5}$ mol/mol silver halide) | Sensitizing dye | Amount added ($\times 10^{-4}$ mol/mol silver halide) | Relative sensitivity | |
|---|---|---|---|---|---|
| | | | | White light | Yellow light |
| I-17 | 3.2 | III-J* | 1.6 | 71.8 | 52.0 |
| " | " | III-K* | 1.6 | 83.3 | 52.0 |
| " | " | III-L* | 1.6 | 87.2 | 65.7 |
| I-17 | 3.2 | III-M* | 1.6 | 85.2 | 73.5 |
| " | " | III-N* | 1.6 | 76.2 | 73.5 |
| " | " | III-O* | 1.6 | 77.6 | 67.0 |
| " | " | III-P* | 1.6 | 93.3 | 82.5 |
| " | " | III-Q* | 1.6 | 43.7 | 28.8 |
| " | " | III-R* | 1.6 | 57.6 | 41.3 |
| " | " | III-S* | 1.6 | 76.0 | 57.0 |
| " | " | III-T* | 1.6 | 85.2 | 65.7 |

*Dyes for comparison

Dyes for comparison listed in the above Table are analogous to the dyes represented by general formula (II) used in the invention in their chemical structure. However, all of them will reduced the sensitivity when used together with the dye represented by general formula (I).

Sensitizing dyes for comparison:

III-A

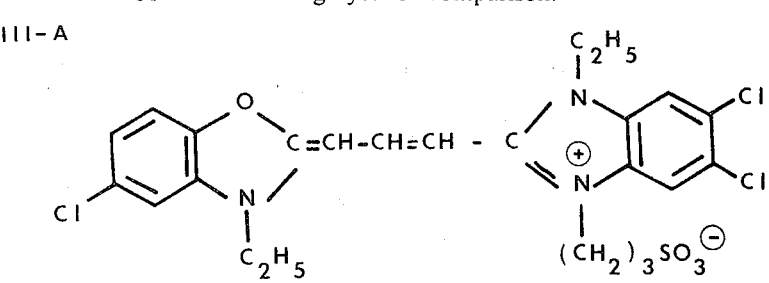

III-B

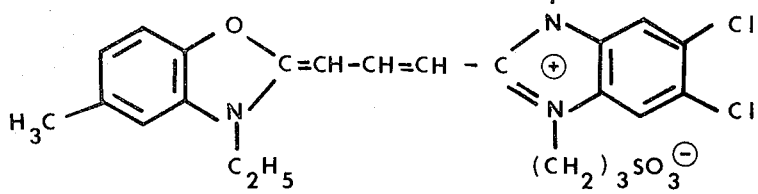

III-C
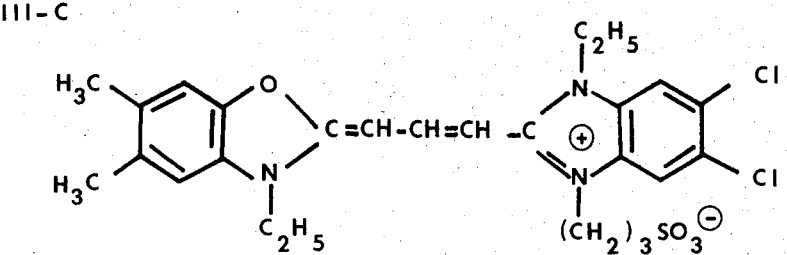
III-D
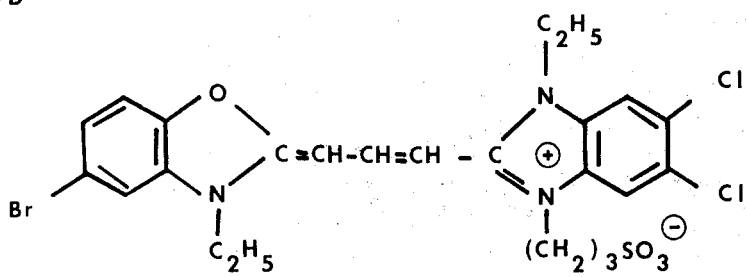
III-E
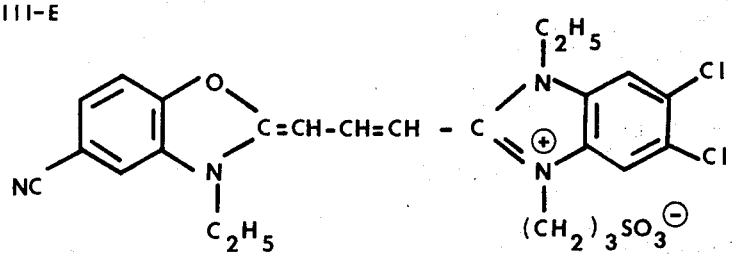
III-F
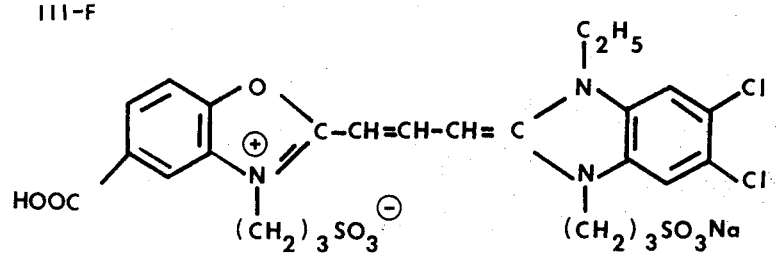
III-G
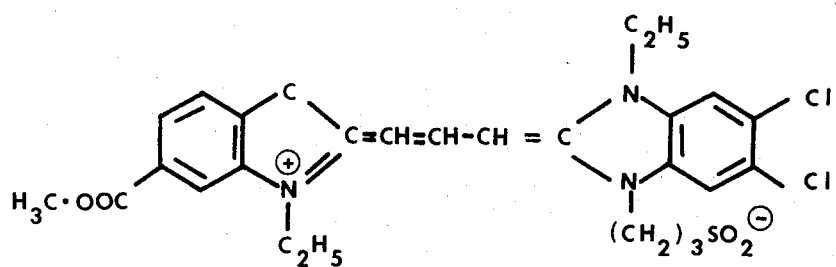
III-H
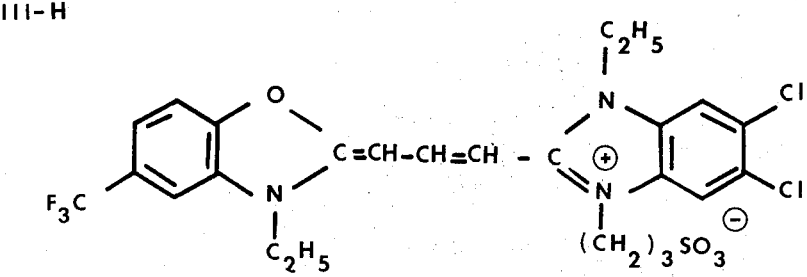

III-J
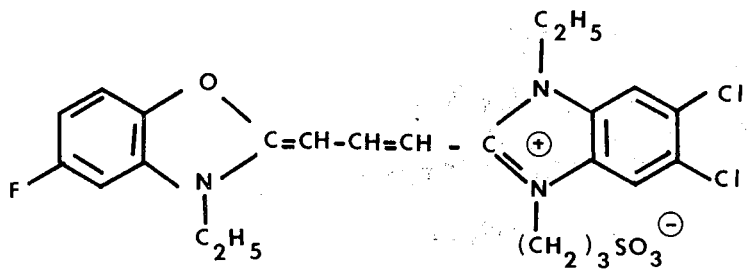
III-K
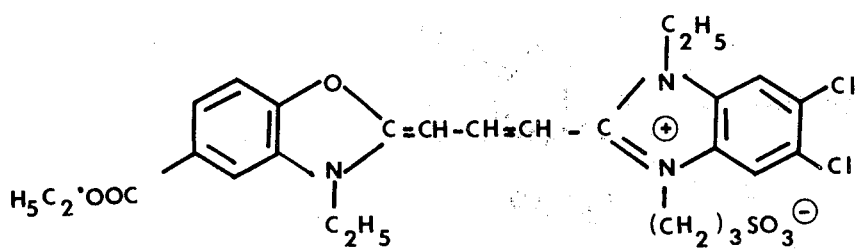
III-L
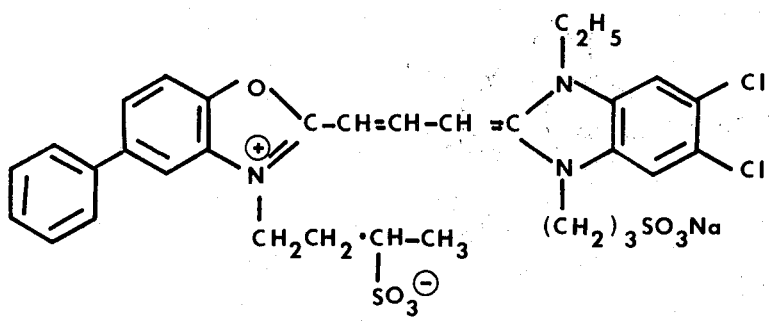
III-M
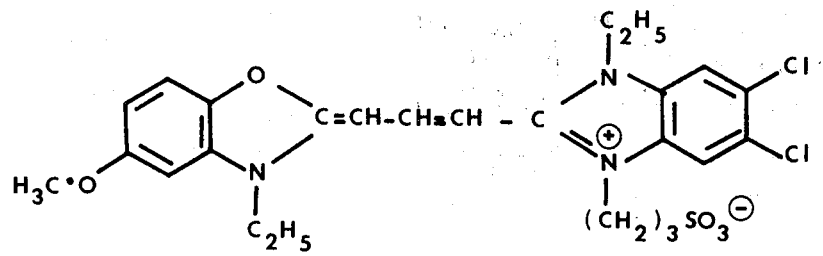
III-N
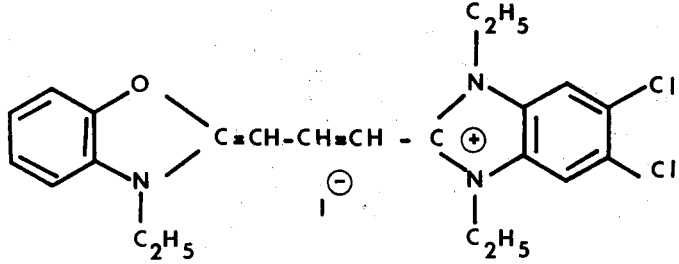
III-O
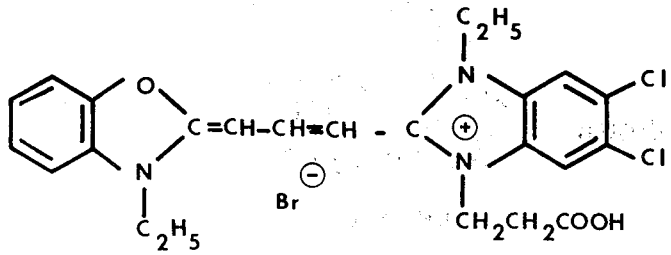

III-P
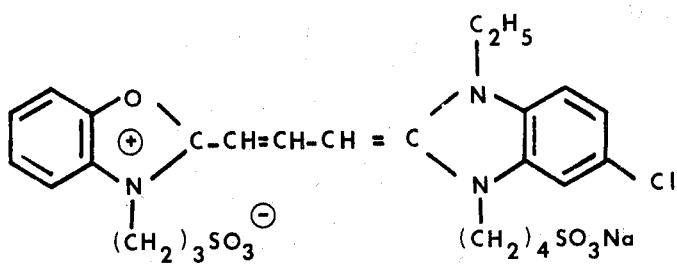
III-Q
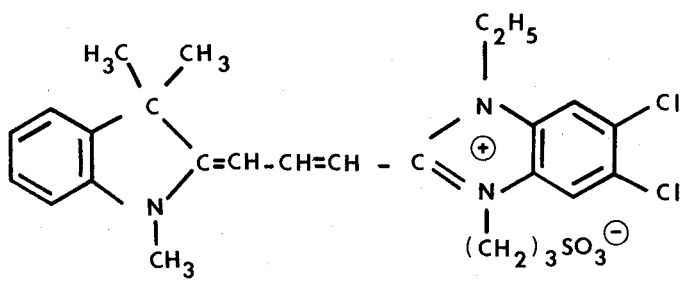
III-R
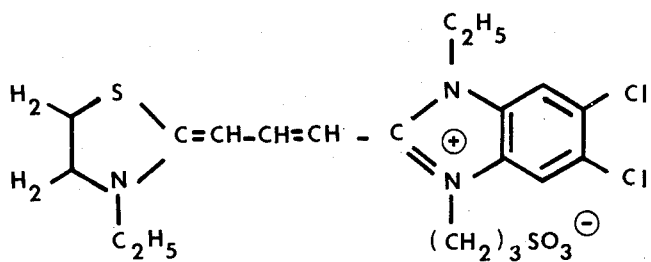
III-S
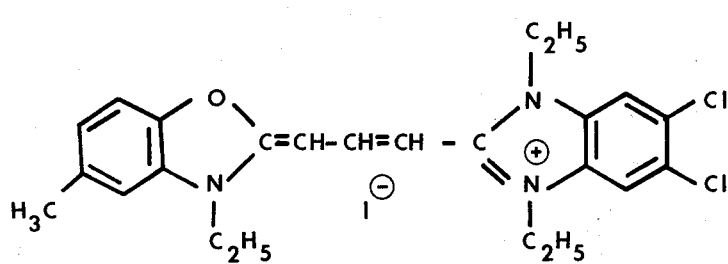
III-T
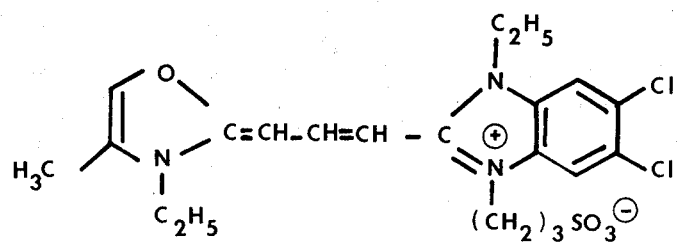

COMPARISON EXAMPLE

The following comparison dyes were used:

III-U*

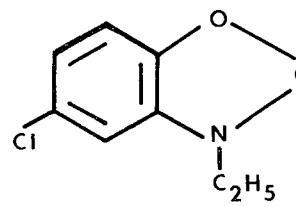

III-V**

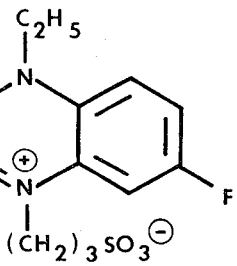

III-W***

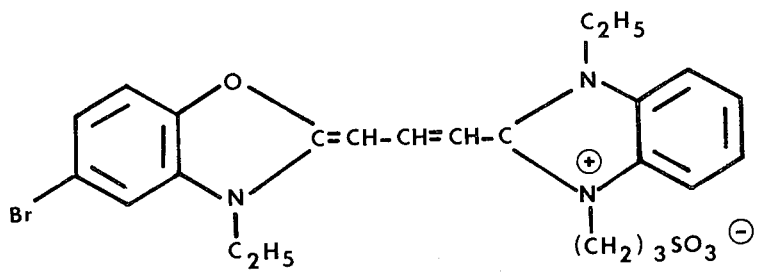

\* Compare to Dye II-1 of the present invention.

\** Compare to Dye II-5 of the present invention.

\*** Compare to Dye II-9 of the present invention.

The procedure of Example 1 was followed using the dye combinations as shown in the Table below with the results shown in the Table being obtained.

TABLE

| Sensitizing Dye | Amount Added ($\times 10^{-5}$ mol/mol Silver Halide) | Sensitizing Dye | Amount Added ($\times 10^{-4}$ mol/mol Silver Halide) | Relative Sensitivity* | | | Observed Density Due to Dye Remaining after Development |
|---|---|---|---|---|---|---|---|
| | | | | White Light | Yellow Light | Blue Light | |
| I-13 | 4 | III-U | 2.0 | 108 | 91.2 | 3.0 | 0.01 |
| I-13 | 4 | III-V | 2.0 | 112 | 90.5 | 3.0 | 0.01 |
| I-13 | 4 | III-W | 2.0 | 105 | 93.3 | 3.0 | 0.01 |

Comparing the above results to the results of Table 1, it is easily seen that Dyes II-1, II-5 and II-9, respectively, are superior to Comparison Dyes III-U, III-V and III-W, respectively.

While the invention has been described in detail and with reference to specific embodiments thereof, it will be apparent to one skilled in the art that various changes and modifications can be made therein without departing from the spirit and scope thereof.

What is claimed is:

1. A silver halide photographic emulsion containing a supersensitizing amount of at least one sensitizing dye represented by general formula (I);

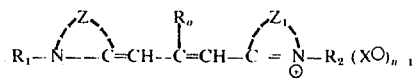

wherein Z and $Z_1$ each represent the atoms necessary to complete a benzothiazole nucleus, naphthothiazole nucleus or benzoselenazole nucleus, $R_o$ represents a lower alkyl group of 1 – 4 carbon atoms, $R_1$ and $R_2$ each represents an alkyl group having at least one carboxyl group or an alkyl group having at least one sulfo group, at least one of $R_1$ and $R_2$ being an alkyl group having at least one sulfo group, X represents an anion forming a salt with a quaternary nitrogen atom in the cyanine dye, $n$ represents 1 or 2, and, when $n=1$, the dye forms a betaine-like structure, and at least one sensitizing dye represented by the following general formula (II);

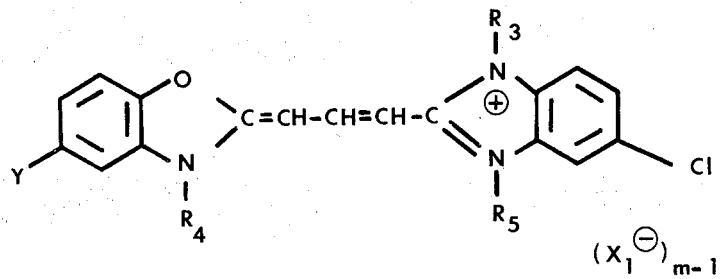

wherein $R_3$ represents a lower alkyl group of 1 – 4 carbon atoms or an allyl group, Y represents a halogen atom, $R_4$ represents an alkyl group (provided that when $R_5$ is an alkyl group containing at least one sulfo group, $R_4$ is not an alkyl group containing at least one sulfo group), $R_5$ represents an alkyl group containing at least one carboxyl group or an alkyl group containing at least one sulfo group, $X_1$ represents an anion forming a salt with a quaternary nitrogen atom in the cyanine dye, $m$ represents 1 or 2, and, when $n=1$, the dye forms a betaine-like structure.

2. A silver halide photographic emulsion as claimed in claim 1 wherein if $R_1$ or $R_2$ is carboxy substituted alkyl it has up to 4 carbon atoms in the alkyl moiety of the alkyl group.

3. A silver halide photographic emulsion as claimed in claim 1 wherein $R_1$ or $R_2$ if alkyl have up to 4 carbon atoms in the alkyl moiety of the alkyl group thereof, and the alkyl group is selected from the class consisting of carboxyalkoxyalkyl, carboxyalkyl, carboxyaralkyl where the aryl moiety is a benzene ring, sulfoalkyl, hydroxysulfoalkyl, sulfoalkoxyalkyl, acetoxysulfoalkyl and sulfoaralkyl where the aryl moiety is a benzene ring.

4. A silver halide photographic emulsion as claimed in claim 3 wherein Z and $Z_1$ are benzothiazole, naphthothiazole or benzoselenazole which can be substituted with a halogen atom, an alkyl group, alkoxy group, hydroxy group, cyano group or two or more thereof.

5. A silver halide photographic emulsion as claimed in claim 1 wherein the alkyl moiety in the alkyl group of $R_4$ contains from 1 to 4 carbon atoms.

6. A silver halide photographic emulsion as claimed in claim 5 wherein $R_4$ is selected from the class consisting of hydroxyalkyl, acetoxyalkyl, an alkyl group containing at least one sulfo group or an alkyl group containing at least one carboxy group, provided that when $R_5$ represents an alkyl group containing a sulfo group $R_4$ does not equal an alkyl group containing a sulfo group.

7. A silver halide photographic emulsion as claimed in claim 6 wherein if $R_4$ is an alkyl group containing at least one carboxy group it is carboxyalkyl, carboxyalkoxyalkyl or carboxyaralkyl, and if $R_4$ is an alkyl group containing at least one sulfo group it is sulfoalkyl, hydroxysulfoalkyl, sulfoalkoxyalkyl, acetoxysulfoalkyl or sulfoaralkyl.

8. A silver halide photographic emulsion as claimed in claim 7 where any aryl moiety is monoaryl.

9. A silver halide photographic emulsion as claimed in claim 1 wherein $R_5$ represents an alkyl group containing at least one carboxyl group wherein the alkyl moiety of the alkyl group has 1 to 4 carbon atoms.

10. A silver halide photographic emulsion as claimed in claim 1 wherein $R_5$ is selected from the class consisting of carboxyalkyl, carboxyalkoxyalkyl, carboxyaralkyl where the aryl moiety is a benzene ring, sulfoalkyl, hydroxysulfoalkyl, sulfoalkoxyalkyl, acetoxysulfoalkyl or sulfoaralkyl where the aryl moiety is a benzene ring.

11. A silver halide photographic emulsion as claimed in claim 1 wherein X or $X_1$ is a halogen ion, a mineral acid anion or organic acid anion.

12. A silver halide photographic emulsion as claimed in claim 1 wherein the ratio of the sensitizing dye of general formula (I) to the sensitizing dye of general formula (II) is in the range of from about 9:1 to about 1:9, weight ratio.

13. A silver halide photographic emulsion as claimed in claim 12 wherein the sensitizing dye of general formula (I) and the sensitizing dye of general formula (II) are each incorporated in the silver halide emulsion in an amount of from about $1 \times 10^{-6}$ to about $5 \times 10^{-3}$ mol per gram molecule of silver halide.

14. A silver halide photographic emulsion as claimed in claim 1 which is chemically sensitized.

15. A silver halide photographic emulsion as claimed in claim 14 wherein the chemical sensitization is a noble metal sensitization, a sulfur sensitization, a reduction sensitization or a polyalkylene oxide sensitization.

16. A silver halide photographic emulsion as described in claim 1 wherein a silver halide comprising silver bromoiodide is used.

17. A silver halide photographic emulsion as described in claim 1 wherein a silver halide mainly comprising silver halide grains having a (1 0 0) face is used.

18. A silver halide photographic emulsion as described in claim 1 wherein $R_o$ in general formula (I) is a methyl group.

19. A silver halide photographic emulsion as described in claim 1 wherein $R_1$ and $R_2$ in general formula (I) are sulfoalkyl groups.

20. A silver halide photographic emulsion as described in claim 1 wherein Y in general formula (II) is a chlorine atom.

21. A silver halide photographic emulsion as described in claim 1 wherein $R_4$ in general formula (II) is a lower alkyl group.

22. A silver halide photographic emulsion as described in claim 1 wherein $R_5$ in general formula (II) is a sulfoalkyl group.

* * * * *